US010560870B2

(12) United States Patent
Wu

(10) Patent No.: US 10,560,870 B2
(45) Date of Patent: Feb. 11, 2020

(54) DEVICE AND METHOD OF HANDLING CELLULAR-WLAN AGGREGATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 142 days.

(21) Appl. No.: 15/659,626

(22) Filed: Jul. 26, 2017

(65) Prior Publication Data

US 2018/0035330 A1 Feb. 1, 2018

Related U.S. Application Data

(60) Provisional application No. 62/367,066, filed on Jul. 26, 2016.

(51) Int. Cl.
| | |
|---|---|
| *H04W 28/08* | (2009.01) |
| *H04L 5/00* | (2006.01) |
| *H04W 76/30* | (2018.01) |
| *H04W 88/06* | (2009.01) |
| *H04W 76/19* | (2018.01) |
| *H04W 36/28* | (2009.01) |
| *H04W 36/00* | (2009.01) |

(52) U.S. Cl.
CPC .......... *H04W 28/085* (2013.01); *H04L 5/001* (2013.01); *H04L 5/0092* (2013.01); *H04W 76/19* (2018.02); *H04W 76/30* (2018.02); *H04W 88/06* (2013.01); *H04L 5/0094* (2013.01); *H04W 36/0069* (2018.08); *H04W 36/28* (2013.01)

(58) Field of Classification Search
CPC .... H04W 28/085; H04W 76/30; H04L 5/001; H04L 5/0092; H04L 12/2838; H04L 47/40; H04L 1/1635; H04L 2012/5627
See application file for complete search history.

(56) References Cited

U.S. PATENT DOCUMENTS

2017/0118133 A1* 4/2017 Meylan ................ H04L 47/624
2017/0331569 A1* 11/2017 Van Der Velde .... H04B 17/382
(Continued)

OTHER PUBLICATIONS

Search Report dated Dec. 21, 2017 for EP application No. 17183233.0, pp. 1-6.

(Continued)

*Primary Examiner* — Omer S Mian
(74) *Attorney, Agent, or Firm* — Winston Hsu

(57) ABSTRACT

A communication device for handling a cellular-wireless local area network (cellular-WLAN) aggregation (CWA) comprises a storage device for storing instructions and a processing circuit coupled to the storage device. The processing circuit is configured to execute the instructions stored in the storage device. The instructions comprise establishing a radio resource control (RRC) connection to a cellular network; receiving a first RRC message configuring a CWA for a radio bearer from the cellular network on the RRC connection; enabling data handling for the radio bearer in response to the first RRC message; receiving an RRC-ConnectionRelease message or a MobilityFromEUTRA-Command message on the RRC connection from the cellular network; and disabling the data handling for the radio bearer and not performing data recovery for the radio bearer, in response to the RRCConnectionRelease message or the MobilityFromEUTRACommand message.

18 Claims, 3 Drawing Sheets

(56) References Cited

U.S. PATENT DOCUMENTS

2017/0332291 A1* 11/2017 Sirotkin ............... H04W 24/10
2017/0332419 A1* 11/2017 Kim .................... H04L 1/1861
2018/0092146 A1* 3/2018 Hong ................... H04W 76/15

OTHER PUBLICATIONS

ETSI TS 136 323 V13.0.0 (Jan. 2016), "LTE; Evolved Universal Terrestrial Radio Access (E-UTRA); Packet Data Convergence Protocol (PDCP) specification (3GPP TS 36.323 version 13.0.0 Release 13)", XP014266434, pp. 1-38.
Nokia Networks, Qualcomm Incorporated, "Clarification on statusReportRequired handling", 3GPP TSG-RAN WG2 Meeting #88, R2-144927, Nov. 17-21, 2014, San Francisco, USA, XP050876982, pp. 1-18.
Ericsson, "PDCP at RRC Resume", 3GPP TSG-RAN WG2 #NB-IOT ad-hoc, Tdoc R2-163260, May 3-4, 2016, Sophia Antipolis, France, XP051095112, pp. 1-4.
Qualcomm Incorporated, "LWA Miscellaneous Corrections", 3GPP TSG-RAN2 Meeting #93, R2-161162, Feb. 15-19, 2016, St. Julians, Malta, XP051055146, pp. 1-83.
3GPP TS 36.331 V13.2.0 (Jun. 2016) Technical Specification 3rd Generation Partnership Project; Technical Specification Group Radio Access Network; Evolved Universal Terrestrial Radio Access (E-UTRA); Radio Resource Control (RRC); Protocol specification (Release 13).
3GPP TS 36.323 V13.2.1 (Jun. 2016) Technical Specification 3rd Generation Partnership Project; Technical Specification Group Radio Access Network; Evolved Universal Terrestrial Radio Access (E-UTRA); Packet Data Convergence Protocol (PDCP) specification (Release 13).

* cited by examiner

DEVICE AND METHOD OF HANDLING CELLULAR-WLAN AGGREGATION

CROSS REFERENCE TO RELATED APPLICATIONS

This application claims the benefit of U.S. Provisional Application No. 62/367,066 filed on Jul. 26, 2016, which is incorporated herein by reference.

BACKGROUND OF THE INVENTION

1. Field of the Invention

The present invention relates to a device and a method used in a wireless communication system, and more particularly, to a device and a method of handling a cellular-wireless local area network (cellular-WLAN) aggregation.

2. Description of the Prior Art

In a long-term evolution (LTE) system, a radio access network known as an evolved universal terrestrial radio access network (E-UTRAN) includes at least one evolved Node-B (eNB) for communicating with a user equipment (UE), and for communicating with a core network. The core network may include mobility management and Quality of Service (QoS) control for the UE.

The LTE system may be aggregated with a wireless local area network (WLAN) to improve throughput of the LTE system (e.g., LTE-WLAN Aggregation (LWA)). That is, the eNB transmits/receives data via both LTE communication and WLAN communication to/from the UE. Accordingly, the UE simultaneously connects to the LTE system and the WLAN.

SUMMARY OF THE INVENTION

The present invention therefore provides a communication device and method for handling a cellular-wireless local area network (cellular-WLAN) aggregation to solve the abovementioned problem.

A communication device for handling a cellular-wireless local area network (cellular-WLAN) aggregation (CWA) comprises a storage device for storing instructions and a processing circuit coupled to the storage device. The processing circuit is configured to execute the instructions stored in the storage device. The instructions comprise establishing a radio resource control (RRC) connection to a cellular network; receiving a first RRC message configuring a CWA for a radio bearer from the cellular network on the RRC connection; enabling data handling for the radio bearer in response to the first RRC message; communicating a plurality of packet data convergence protocol (PDCP) protocol data unit (PDUs) associated with the radio bearer with a WLAN according to the CWA, when the data handling for the radio bearer is enabled; receiving an RRCConnectionRelease message or a MobilityFromEUTRACommand message on the RRC connection from the cellular network; and disabling the data handling for the radio bearer and not performing data recovery for the radio bearer, in response to the RRCConnectionRelease message or the MobilityFromEUTRACommand message.

A method for handling a cellular-wireless local area network (cellular-WLAN) aggregation (CWA) comprises establishing a radio resource control (RRC) connection to a cellular network; receiving a first RRC message configuring a CWA for a radio bearer from the cellular network on the RRC connection; enabling data handling for the radio bearer in response to the first RRC message; communicating a plurality of packet data convergence protocol (PDCP) protocol data unit (PDUs) associated with the radio bearer with a WLAN according to the CWA, when the data handling for the radio bearer is enabled; receiving an RRCConnectionRelease message or a MobilityFromEUTRACommand message on the RRC connection from the cellular network; and disabling the data handling for the radio bearer and not performing data recovery for the radio bearer, in response to the RRCConnectionRelease message or the MobilityFromEUTRACommand message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
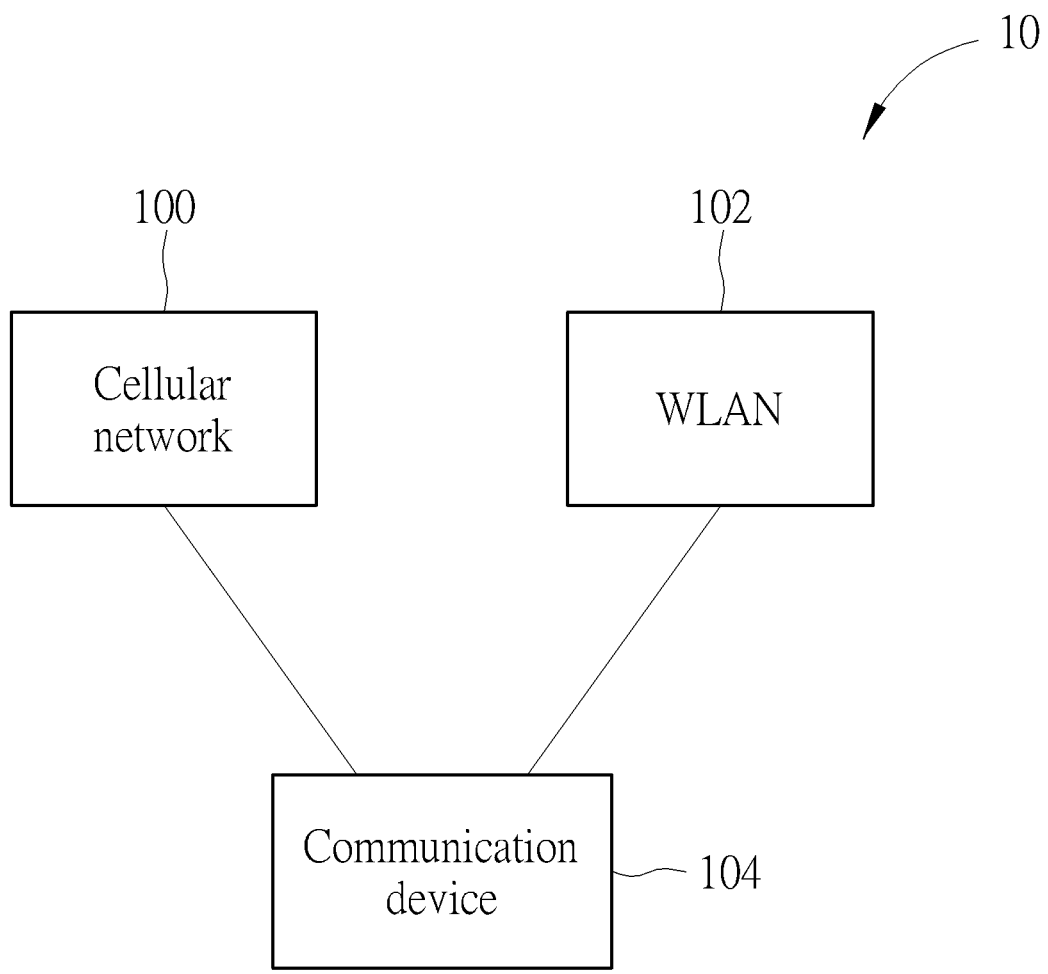
FIG. 1 is a schematic diagram of a wireless communication system according to an example of the present invention.

FIG. 1 is a schematic diagram of a wireless communication system 10 according to an example of the present invention. The wireless communication system 10 is briefly composed of a cellular network 100, a wireless local area network (WLAN) 102 and a communication device 104. Practically, the cellular network 100 may be an evolved UTRAN (E-UTRAN) comprising at least one evolved NB (eNB) and/or at least one relay station. In another example, the cellular network 100 may be a fifth generation (5G) network including at least one 5G eNB which employs orthogonal frequency-division multiplexing (OFDM) and/or non-OFDM, and a transmission time interval (TTI) for communicating with the communication device is smaller than 1 millisecond (ms). In general, a base station (BS) is used to refer any of the eNB and the 5G eNB. In one example, a WLAN standard operated by the WLAN 102 may include IEEE 802.11a, 802.11b, 802.11g, 802.11n, 802.11ac, 802.11ad, 802.11ax, etc. The WLAN 102 may operate at 2.4 GHz or 5 GHz, but is not limited herein.

The communication device 104 can be a user equipment (UE), a mobile phone, a laptop, a tablet computer, an electronic book, a portable computer system, a vehicle or aircraft. In addition, the cellular network 100 (or the WLAN 102) and the communication device 104 can be seen as a transmitter or a receiver according to direction (i.e., transmission direction), e.g., for an uplink (UL), the communication device 104 is the transmitter and the cellular network 100 (or the WLAN 102) is the receiver, and for a downlink (DL), the cellular network 100 (or the WLAN 102) is the transmitter and the communication device 104 is the receiver.

Figure 2:
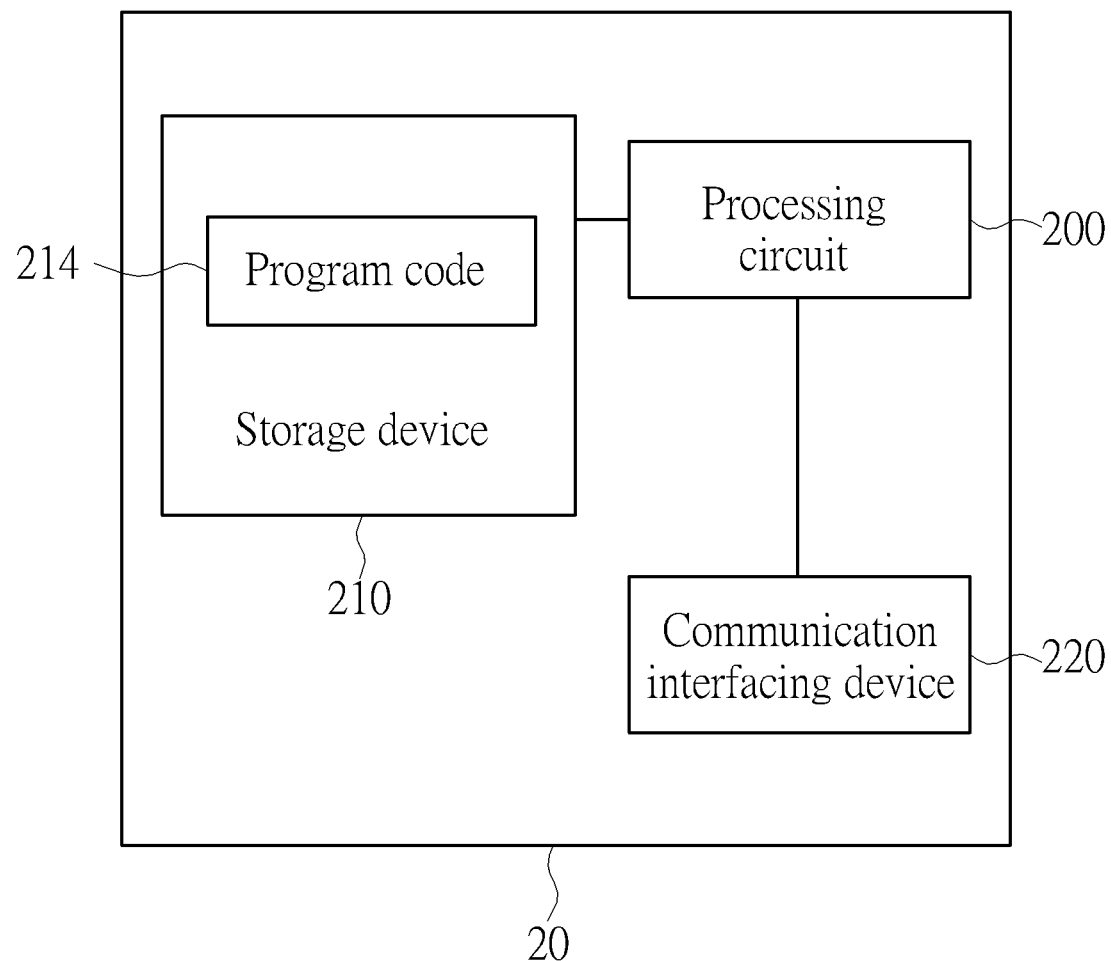
FIG. 2 is a schematic diagram of a communication device according to an example of the present invention.

FIG. 2 is a schematic diagram of a communication device 20 according to an example of the present invention. The communication device 20 may be the communication device 104, the cellular network 100 or the WLAN 102 shown in FIG. 1, but is not limited herein. The communication device 20 may include a processing circuit 200 such as a microprocessor or Application Specific Integrated Circuit, a storage device 210 and a communication interfacing device 220.

The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes a transceiver and is used to transmit and receive signals (e.g., data, messages and/or packets) according to processing results of the processing circuit 200.

In the following embodiments, a UE is used to represent the communication device 104 in FIG. 1, to simplify the illustration of the embodiments.

A UE may be configured with a long-term evolution (LTE)-WLAN Aggregation (LWA) data radio bearer (DRB) (e.g., the UE receives a drb-ToAddMod which configures a DRB and includes a drb-TypeLWA set to "TRUE" from the E-UTRAN) and a lwa-Configuration by the E-UTRAN. When the UE receives a first RRCConnectionRelease message including a rrc-Suspend (i.e., indicating a radio resource control (RRC) suspension), the UE suspends a RRC connection and may perform a release of a LWA configuration according to the 3rd Generation Partnership Project (3GPP) standard. In the release of the LWA configuration, the UE performs a packet data converge protocol (PDCP) data recovery. In the PDCP data recovery, the UE may compile a first PDCP status report. To transmit the first PDCP status report, the UE may initiate a RRC connection resume procedure to resume the RRC connection by transmitting a first RRCConnectionResumeRequest message. The UE transmits the first PDCP status report to the E-UTRAN, when the UE receives a first RRCConnectionResume message from the E-UTRAN. After transmitting the first PDCP status report, the UE may not have any PDCP data protocol data unit (PDU) to transmit, and then the E-UTRAN transmits a second RRCConnectionRelease indicating the rrc-Suspend to the UE, i.e., to suspend the RRC connection of the UE. Again, the UE compiles a second PDCP status report, and initiates a second RRC connection resume procedure by transmitting a second RRCConnectionResumeRequest message. The UE transmits the second PDCP status report to the E-UTRAN, when the RRC connection is resumed by receiving a second RRCConnectionResume message from the E-UTRAN. Accordingly, the UE is not able to be suspended. Similar issues also happen, when the UE receives a third RRCConnectionRelease not including the rrc-Suspend or receives a MobilityFromEUTRACommand.

In addition, when the UE initiates a RRC connection resume procedure, the UE also performs the PDCP data recovery again. Then, the UE may compile a third PDCP status report. The UE transmits the third PDCP status report, when the RRC connection is resumed. However, the third PDCP status report does not provide any useful information, and radio resources and battery power of the UE are wasted due to the transmission of the third PDCP status report.

Figure 3:
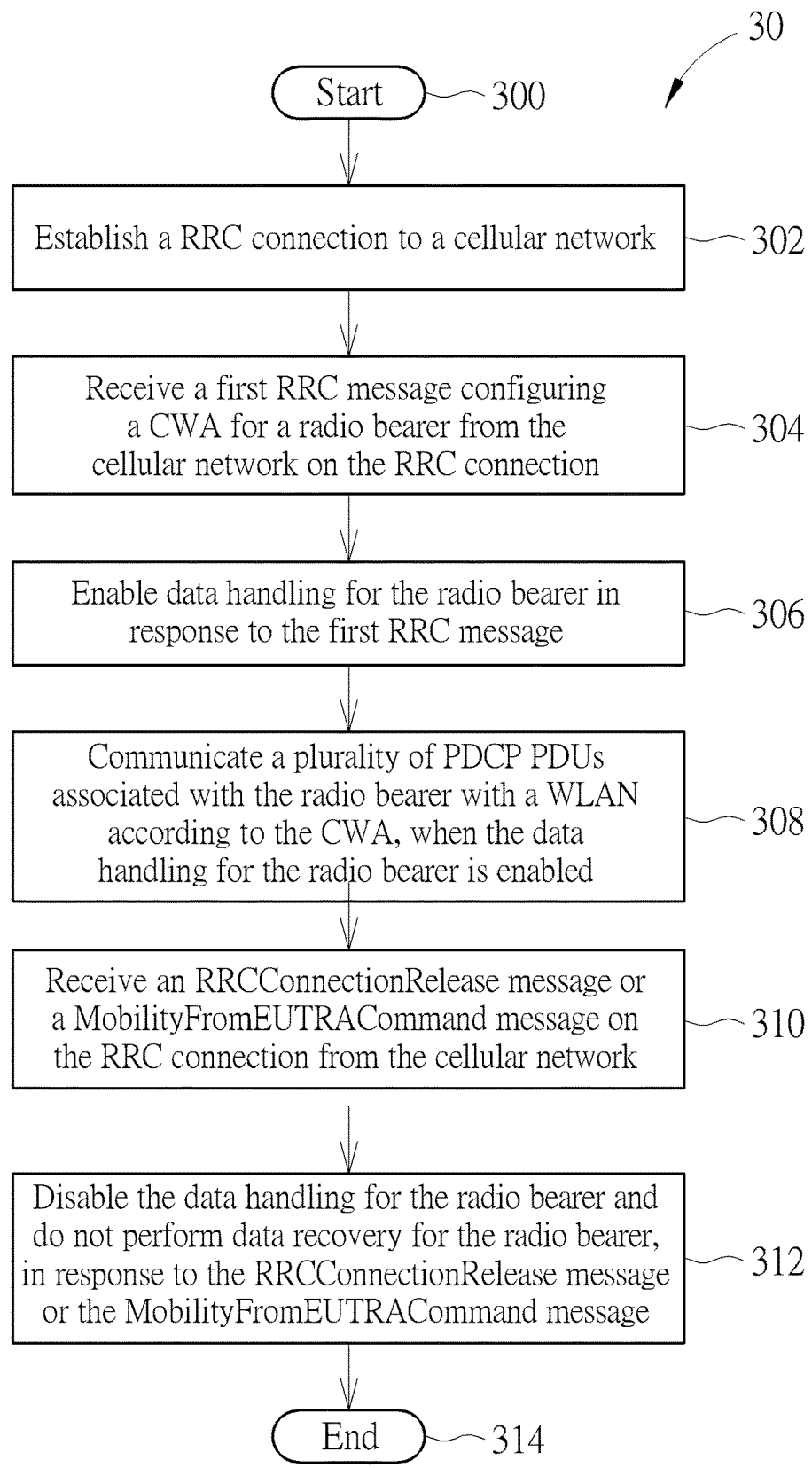
FIG. 3 is a flowchart of a process according to an example of the present invention.

FIG. 3 is a flowchart of a process 30 according to an example of the present invention. The process 30 may be utilized in a UE (e.g., the communication device 104), to handle a cellular-WLAN aggregation (CWA). The process 30 includes the following steps:

Step 300: Start.

Step 302: Establish a RRC connection to a cellular network.

Step 304: Receive a first RRC message configuring a CWA for a radio bearer from the cellular network on the RRC connection.

Step 306: Enable data handling for the radio bearer in response to the first RRC message.

Step 308: Communicate a plurality of PDCP PDUs associated with the radio bearer with a WLAN according to the CWA, when the data handling for the radio bearer is enabled.

Step 310: Receive an RRCConnectionRelease message or a MobilityFromEUTRACommand message on the RRC connection from the cellular network.

Step 312: Disable the data handling for the radio bearer and do not perform data recovery for the radio bearer, in response to the RRCConnectionRelease message or the MobilityFromEUTRACommand message.

Step 314: End.

According to the process 30, the UE establishes a RRC connection to a cellular network (e.g., the cellular network 100). Then, the UE receives a first RRC message configuring a CWA for a radio bearer from the cellular network on the RRC connection. The UE enables data handling for the radio bearer in response to the first RRC message. The UE communicates a plurality of PDCP PDUs associated with the radio bearer with a WLAN (e.g., the WLAN 102) according to the CWA, when the data handling for the radio bearer is enabled. The UE may receive a RRCConnectionRelease message (or a MobilityFromEUTRACommand message) on the RRC connection from the cellular network. Then, the UE disables the data handling for the radio bearer and does not perform data recovery for the radio bearer, in response to the RRCConnectionRelease message (or the MobilityFromEUTRACommand message). In one example, the data recovery may be a PDCP data recovery. That is, the UE disables the data handling and stops the data recovery, after receiving the RRCConnectionRelease message (or the MobilityFromEUTRACommand message). Thus, the UE can be suspended properly according to the stopped data recovery.

Realization of the process 30 is not limited to the above description. The following examples may be applied to the process 30.

In one example, the RRCConnectionRelease message may or may not include rrc-Suspend. In one example, the data recovery includes compiling a PDCP status report and transmitting the PDCP status report to the cellular network. In one example, the data recovery includes performing a retransmission of PDCP PDU(s) (e.g., all PDCP PDU(s)) previously submitted to an re-established acknowledged mode (AM) radio link control (RLC) entity in an ascending order of COUNT values (associated to the PDCP PDU(s)) from the first PDCP PDU (of the PDCP PDU(s)) for which the successful delivery has not been confirmed by lower layer(s) (e.g. lower than a PDCP layer).

In one example, the RRCConnectionRelease message indicates a suspension of the RRC connection (i.e. including "rrc-Suspend"), or configures the UE to be in an inactive state or a RRC light connection state. The UE stores at least one of a current RRC configuration, a current security context, a PDCP state including a robust header compression (ROHC) state (if configured), a Cell Radio Network Temporary Identifier (C-RNTI) used in a source primary cell (PCell), a cellIdentity, a physical cell identity of the source PCell and a resumeIdentity in response to the RRCConnectionRelease message. When the UE initiates a RRC connection resume procedure to resume the RRC connection, the UE does not perform the data recovery (e.g., the PDCP data recovery).

In one example, when the UE receives the RRCConnectionRelease message, the UE determines that the radio bearer is no longer a CWA DRB. That is, the radio bearer is a cellular only DRB (e.g., LTE or 5G only DRB). When the cellular network configures the CWA for the radio bearer later, the UE enables the data handling for the radio bearer in response to that the radio bearer is configured (e.g., reconfigured) from a cellular only DRB to the CWA DRB.

In one example, the first RRC message includes a CWA-Configuration information element (e.g., LWA-Configuration). The UE may release a CWA-Configuration (i.e., the UE is not configured with the CWA), when the UE receives the RRCConnectionRelease message or initiates a RRC connection resume procedure.

In one example, the first RRC message includes DRB-ToAddMod configuring the radio bearer, and indicates the radio bearer to be a CWA DRB (e.g., LWA DRB or 5G-WLAN aggregation (5GWA) DRB), i.e., adding the radio bearer as a CWA DRB to the UE or reconfiguring the radio bearer from a cellular only DRB to a CWA DRB. In another example, the cellular network transmits a second RRC message including the DRB-ToAddMod to the UE. The RRCConnectionRelease message does not include any CWA-Configuration and any DRB-ToAddMod.

In one example, when the UE receives a third RRC message (e.g., RRCConnectionReconfiguration message) which indicates a release of the CWA or reconfigures the radio bearer to be a cellular-only radio bearer, the UE disables the data handling for the radio bearer and performs the data recovery in response to the third RRC message. In one example, the third RRC message includes "release" in a CWA-configuration (e.g. LWA-configuration). In another example, the third RRC message includes a DRB-Identity of the radio bearer and a drb-TypeLWA associated to the DRB-Identity set to "FALSE".

In one example, the UE further deletes any existing value in variables VarWLAN-MobilityConfig and VarWLAN-Status, stops a timer T351 (if running), and stops WLAN status monitoring and WLAN connection attempt(s) (if configured).

In one example, the first RRC message includes one or more identifier(s) of the WLAN. The one or more identifier(s) may include at least one of a service set identifier (SSID), a basic SSID (BSSID) and a homogenous extended SSID (HESSID).

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a device and a method for handling a CWA. The UE disables data handling for a radio bearer and stops data recovery for the radio bearer, after receiving a RRCConnectionRelease message (or a MobilityFromEUTRACommand message). Thus, the UE is suspended properly according to the stopped data recovery.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a cellular-wireless local area network (cellular-WLAN) aggregation (CWA), comprising:
    a storage device, for storing instructions of:
        establishing a radio resource control (RRC) connection to a cellular network;
        receiving a first RRC message configuring a CWA for a radio bearer from the cellular network on the RRC connection;
        enabling data handling for the radio bearer in response to the first RRC message;
        communicating a plurality of packet data convergence protocol (PDCP) protocol data unit (PDUs) associated with the radio hearer with a WLAN according to the CWA, when the data handling for the radio bearer is enabled;
        receiving an RRCConnectionRelease message or a MobilityFromEUTRACommand message on the RRC connection from the cellular network; and
        disabling the data handling for the radio bearer and stopping performing data recovery for the radio bearer, in response to the RRCConnectionRelease message or the MobilityFromEUTRACommand message; and
    a processing circuit, coupled to the storage device, configured to execute the instructions stored in the storage device,
    wherein the data recovery comprises performing at least one retransmission of PDCP PDUs previously submitted to an re-established acknowledged mode (AM) radio link control (RLC) entity in an ascending order of COUNT values from the first PDCP PDU of the at least one retransmission of PDCP PDU for which the successful delivery is not confirmed by a lower layer.

2. The communication device of claim 1, wherein the data recovery comprises compiling a PDCP status report and transmitting the PDCP status report to the cellular network.

3. The communication device of claim 1, wherein the RRCConnectionRelease message indicates a suspension of the RRC connection.

4. The communication device of claim 3, wherein the communication device stores at least one of a current RRC configuration, a current security context, a PDCP state comprising a robust header compression (ROHC) state, a Cell Radio Network Temporary Identifier (C-RNTI) used in a source primary cell (PCell), a cellIdentity, a physical cell identity of the source PCell and a resume identity in response to the RRCConnectionRelease message.

5. The communication device of claim 1, wherein the storage device further stores the instruction of:
    stopping performing the data recovery, when the communication device initiates a RRC connection resume procedure to resume the RRC connection.

6. The communication device of claim 1, wherein the storage device further stores the instruction of:
    determining that the radio bearer is not a CWA data radio bearer (DRB), when the communication device receives the RRCConnectionRelease message indicating a suspension of the RRC connection.

7. The communication device of claim 1, wherein the storage device Further stores the instruction of:
    enabling the data handling for the radio bearer in response to that the radio bearer is configured from a cellular only ORB to a CWA ORB, when the cellular network configures the CWA for the radio bearer.

8. The communication device of claim 1, wherein the first RRC message comprises a CWA-Configuration information element.

9. The communication device of claim 1, wherein the storage device further stores the instruction of:
releasing a CWA-Configuration, when the UE receives the RRCConnectionRelease message or initiates a RRC connection resume procedure.

10. The communication device of claim 1, wherein the first RRC message comprises a DRB-ToAddMod configuring the radio bearer, and indicates the radio bearer to be a CWA DRB.

11. The communication device of claim 1, wherein the storage device further stores the instruction of: disabling the data handling for the radio bearer and performing the data recovery, when the UE receives a second RRC message which indicates a release of the CWA or reconfigures the radio bearer to be a cellular-only radio bearer.

12. The communication device of claim 1, wherein the storage device further stores the instructions of:
deleting any existing value in variables VarWLAN-MobilityConfig and VarWLAN-Status; stopping a timerT351; and
stopping WLAN status monitoring and at least one WLAN connection attempt.

13. The communication device of claim 1, wherein the first RRC message comprises at least one identifier of the WLAN, and the at least one identifier comprises at least one of a service set identifier (SSID), a basic SSID (BSSID) and a homogenous extended SSID(HESSID).

14. A method, of a communication device, for handling a cellular-wireless local area network (cellular-WLAN) aggregation (CWA), comprising:
establishing a radio resource control (RRC) connection to a cellular network;
receiving a first RRC message configuring a CWA fora radio bearer from the cellular network on the RRC connection;
enabling data handling for the radio bearer in response to the first RRC message;
communicating a plurality of packet data convergence protocol (PDCP) protocol data unit (PDUs) associated with the radio bearer with a WLAN according to the CWA, when the data handling for the radio bearer is enabled;
receiving an RRC ConnectionRelease message or a MobilityFromEUTRACommand message on the RRC connection from the cellular network; and
disabling the data handling for the radio bearer and stopping performing data recovery for the radio bearer, in response to the RRCConnectionRelease message or the MobilityFromEUTRACommand message,
wherein the data recovery comprises performing at least one retransmission of PDCP PDUs previously submitted to an re-established acknowledged mode (AM) radio link control (RLC) entity in an ascending order of COUNT values from the first PDCP PDU of the at least one retransmission of PDCP PDU for which the successful delivery is not confirmed by a lower laver.

15. The method claim 14, wherein the data recovery comprises compiling a PDCP status report and transmitting the PDCP status report to the cellular network.

16. The method of claim 15, wherein the RRCConnectionRelease message indicates a suspension of the RRC connection.

17. The method of claim 16, further comprising: storing at least one of a current RRC configuration, a current security context, a PDCP state comprising a robust header compression (ROHC) state, a Cell Radio Network Temporary identifier (C-RNTI) used in a source primary cell (PCell), a cellIdentity, a physical cell identity of the source PCell and a resumeIdentity in response to the RRCConnectionRelease message.

18. The method of claim 15, further comprising: stopping performing the data recovery, when initiating a RRC connection resume procedure to resume the RRC connection.

* * * * *